July 12, 1966  R. H. GRIESEMER ETAL  3,260,454
COIN HANDLING DEVICE
Original Filed Oct. 10, 1961  8 Sheets-Sheet 1

INVENTORS
RAYMOND H. GRIESEMER
WESLEY A. GOLLAND
BY Jeffers and Young
ATTORNEYS

July 12, 1966     R. H. GRIESEMER ETAL     3,260,454
COIN HANDLING DEVICE

Original Filed Oct. 10, 1961             8 Sheets-Sheet 2

INVENTORS
RAYMOND H. GRIESEMER
WESLEY A. GOLLAND
BY Jeffers & Young
ATTORNEYS

July 12, 1966

R. H. GRIESEMER ETAL 3,260,454

COIN HANDLING DEVICE

Original Filed Oct. 10, 1961

INVENTORS
RAYMOND H. GRIESEMER
WESLEY A. GOLLAND

BY Jeffers and Young

ATTORNEYS

July 12, 1966 R. H. GRIESEMER ET AL 3,260,454
COIN HANDLING DEVICE
Original Filed Oct. 10, 1961 8 Sheets-Sheet 4

INVENTORS
RAYMOND H. GRIESEMER
WESLEY A. GOLLAND
BY Jeffers and Young
ATTORNEYS

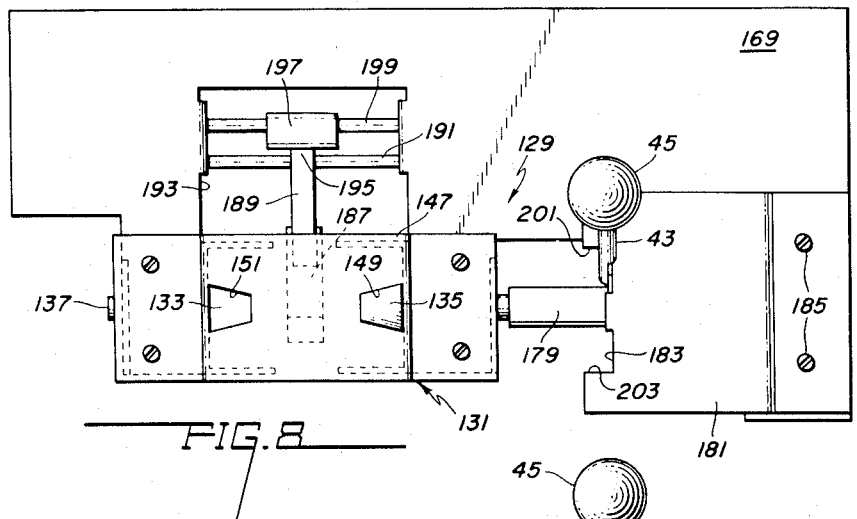
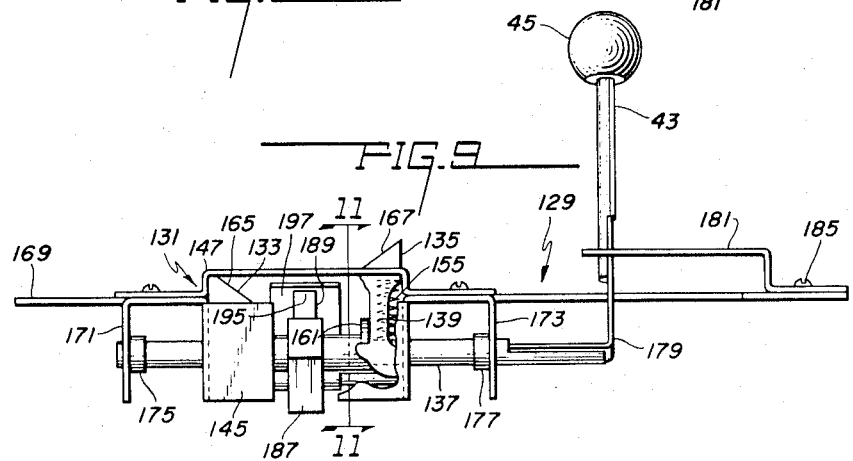
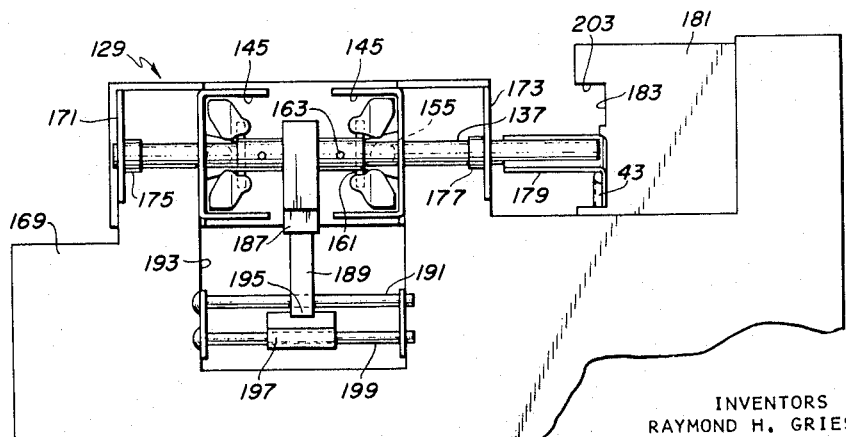

July 12, 1966 R. H. GRIESEMER ETAL 3,260,454
COIN HANDLING DEVICE
Original Filed Oct. 10, 1961 8 Sheets-Sheet 6
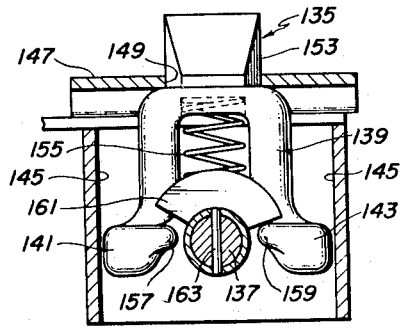
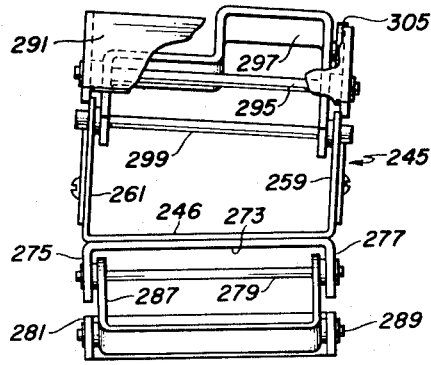
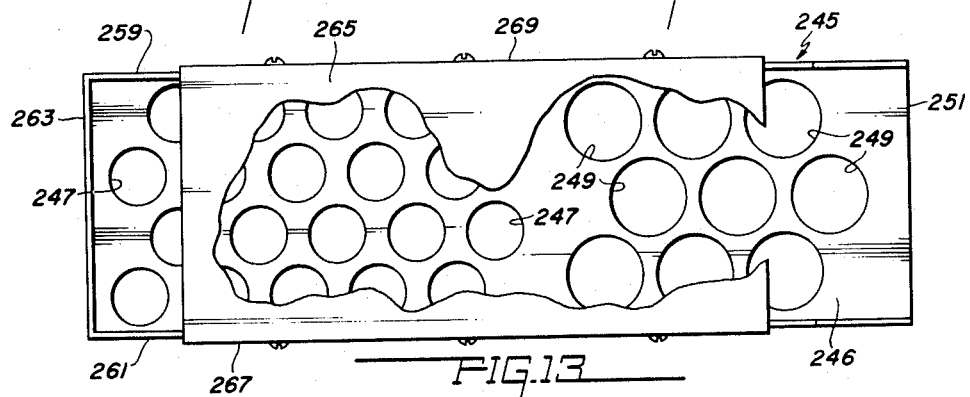
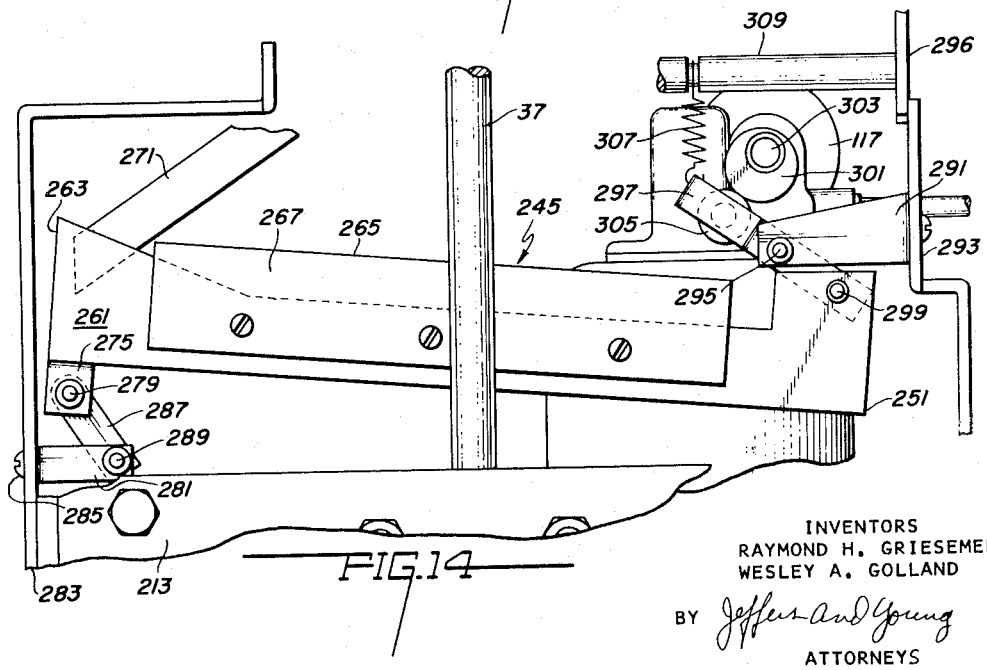
INVENTORS
RAYMOND H. GRIESEMER
WESLEY A. GOLLAND
BY Jeffers and Young
ATTORNEYS INVENTORS
RAYMOND H. GRIESEMER
WESLEY A. GOLLAND
BY Jeffers and Young
ATTORNEYS

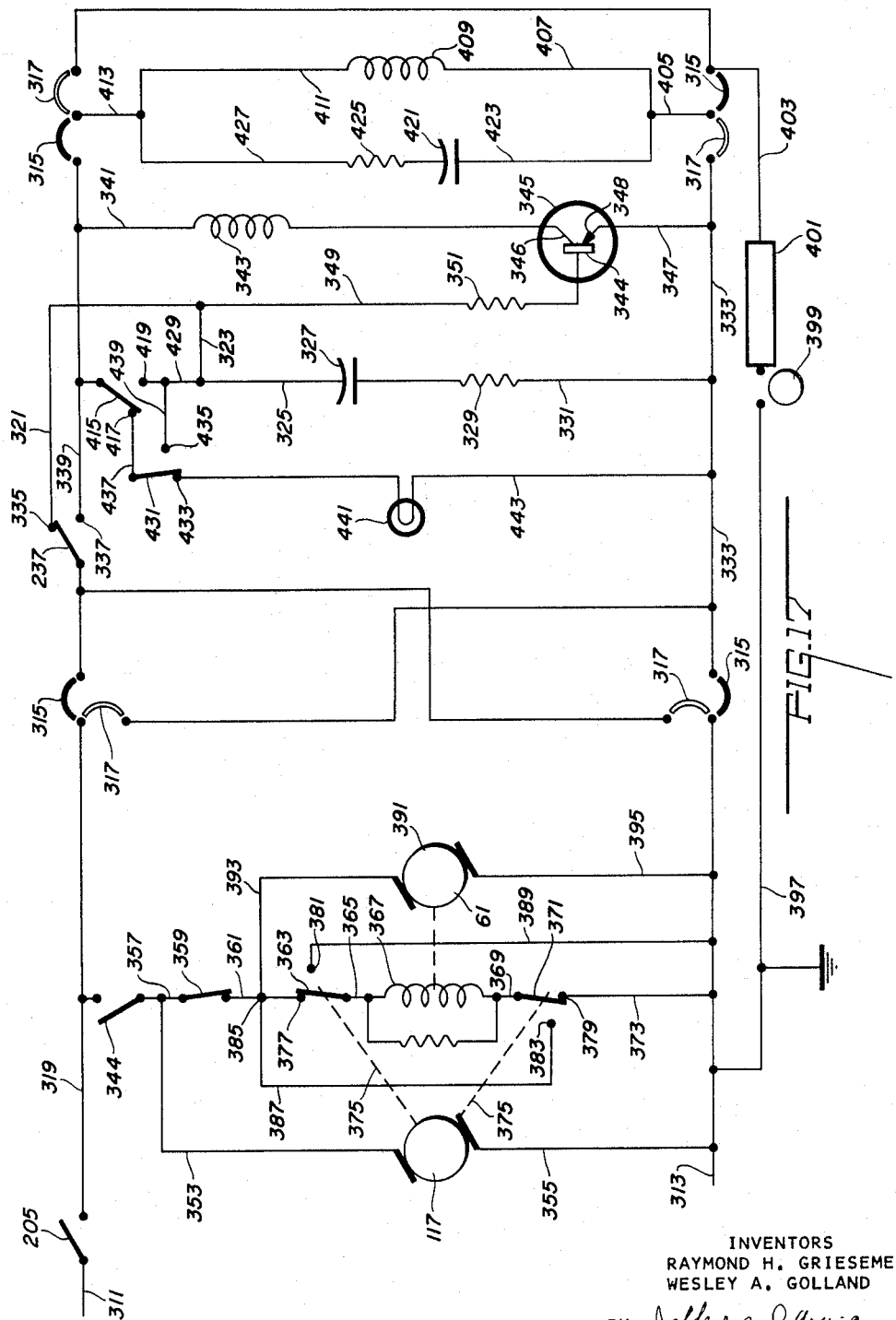

United States Patent Office 3,260,454
Patented July 12, 1966

3,260,454
COIN HANDLING DEVICE
Raymond H. Griesemer, Park Ridge, and Wesley A. Golland, Franklin Park, Ill., assignors to Johnson Fair Box Company, Chicago, Ill., a corporation of Delaware
Original application Oct. 10, 1961, Ser. No. 144,075. Divided and this application Aug. 27, 1965, Ser. No. 483,063
3 Claims. (Cl. 235—100)

This invention relates to a coin handling device, and more particularly it relates to a coin device which will count the coins, register the total number of coins counted in a monetary value or unitized denominational count, print the totalized dollars and cents on a revenue receipt, sort the coins into their proper denominations and convey the sorted coins to the proper coin vault or container.

This application is a divisional of our co-pending application, Serial No. 144,075, filed October 10, 1961.

The primary object of this invention is to provide a coin handling device which is portable and which may be driven from the electrical system of an automobile, truck, or portable hand truck.

Another object of this invention is to provide a coin handling device which is adapted to be used in the vending industry, primarily mounted in the vendor's truck and adapted to totalize all coin receipts of each location on the vendor's route.

A further object of this invention is to provide a coin handling device which a vending route man may utilize to count and sort all coin revenue while driving from location to location.

A still further object of this invention is to provide a coin handling device adapted for use by a vending route man which will give a printed receipt for all coin receipts for each location on the vendor's route.

A salient object of this invention is to provide a coin handling device which may be permanently mounted in the vendor's truck to audit all coin receipts, thus decreasing bookkeeping costs and reducing present coin handling time by the vendor's servicemen, and provide management with a control figure on the total amount of money collected by each truck.

Another object of this invention is to provide a coin handling machine having a coin hopper capable of holding more than one hundred dollars ($100.00) in a mixture of quarters, dimes and nickels, and provided with an automatic feed which is jam proof.

A further object of this invention is to provide an interlock means associated with an opening and closing lever to properly position the ticket or revenue receipt in the printing device so that the printing arm can be operated only when the ticket or revenue receipt is in the proper position, in order that the printing device will not print a closing reading upon an opening reading.

In order to understand clearly the matter of the invention, and the best means for carrying it out, reference may now be had to the drawings in which like numerals denote similar parts throughout the several views.

In the drawings:

FIGURE 8 is a front detailed view of the lock of the interlock mechanism;

FIGURE 9 is a detailed bottom view of the lock covering part of the interlock mechanism;

FIGURE 10 is a rear view of the lock forming part of the interlock mechanism;

FIGURE 11 is a sectional view taken substantially along section line 11—11 in FIGURE 9;

FIGURE 12 is a sectional detailed end view of the sorter assembly;

FIGURE 13 is a top view of the sorter illustrated in FIGURE 12;

FIGURE 14 is a front elevational view of the sorter assembly showing mounting and cam follower in contact with cam on counting mechanism motor;

FIGURE 17 is a schematic diagram of the electrical circuit used in combination with the apparatus of the other figures.

Figure 1:
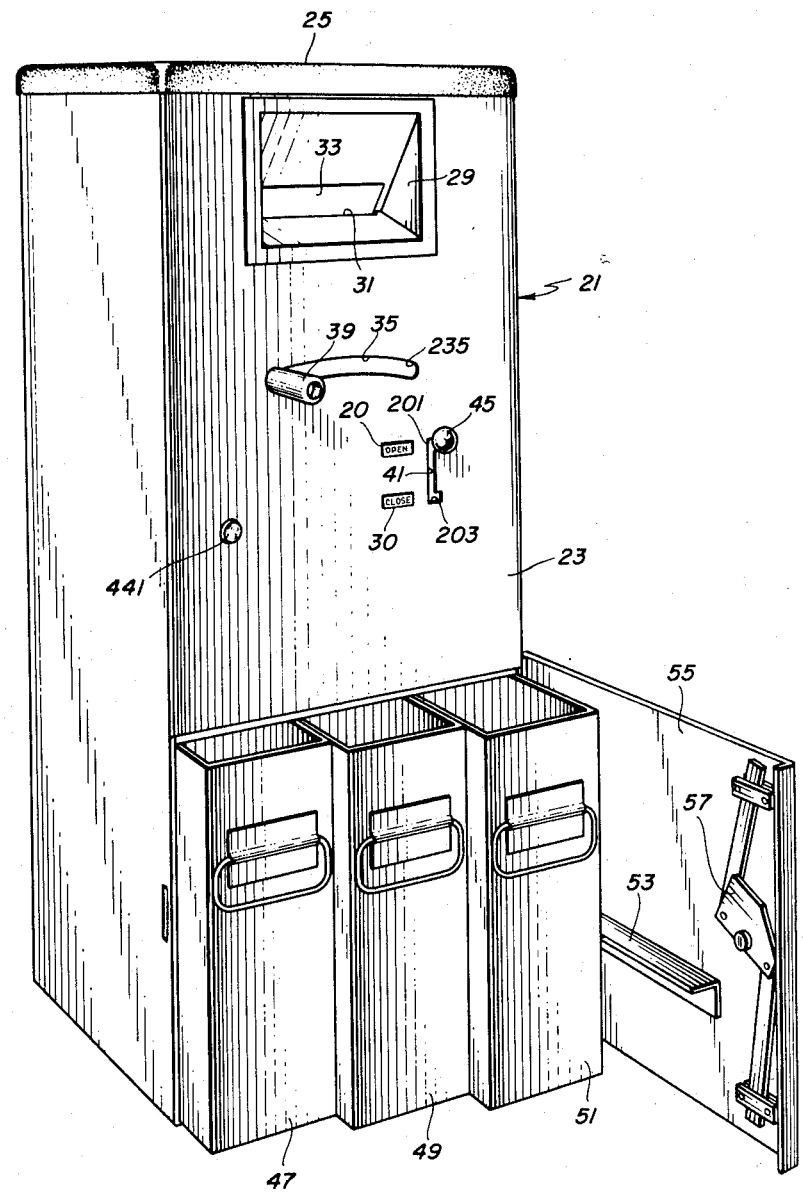
FIGURE 1 is a perspective view of the coin handling device with the vault door open to illustrate the dime, nickel and quarter vaults.
Figure 2:
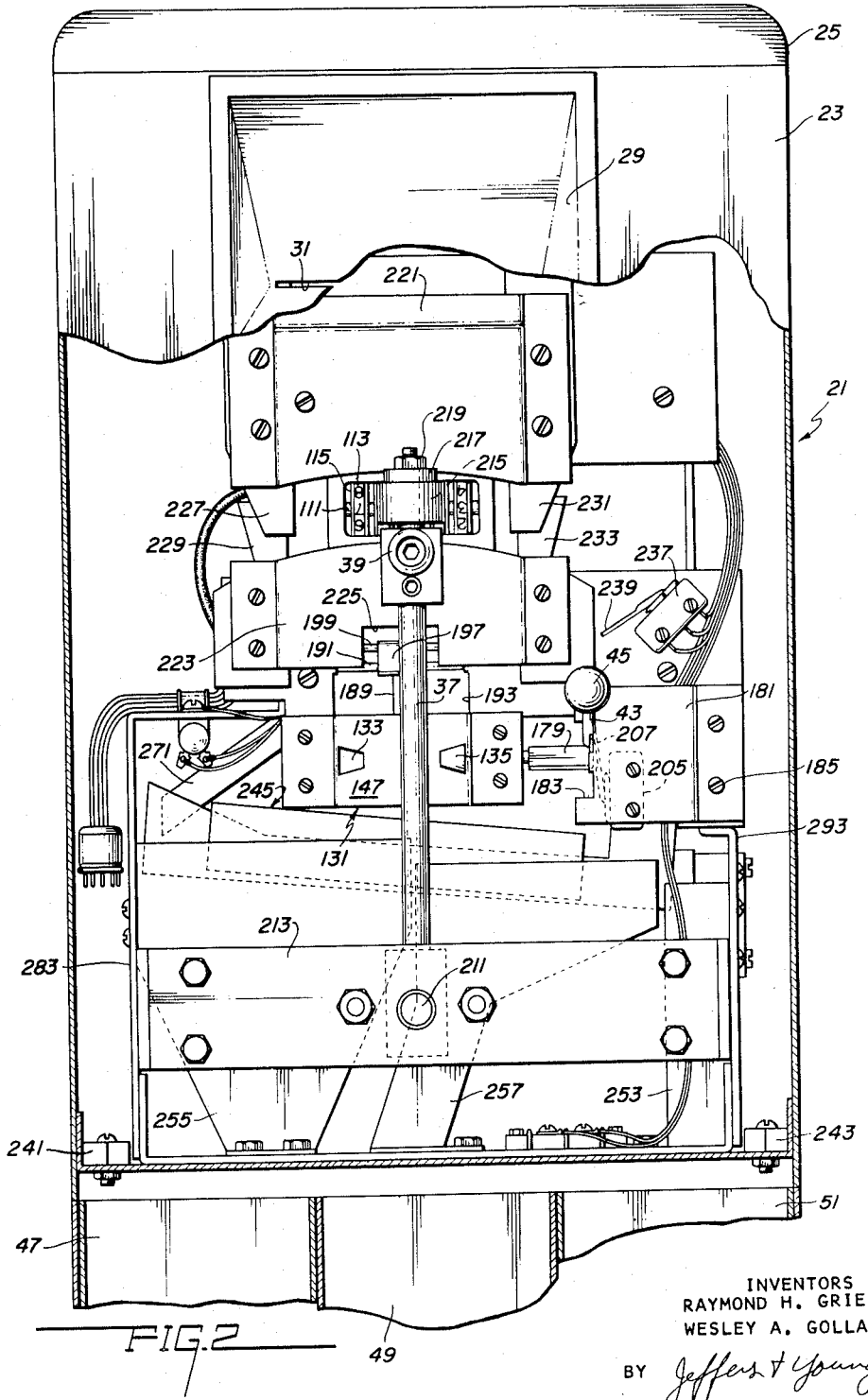
FIGURE 2 is a front elevational view with the cabinet cut away to illustrate the mechanical parts of the coin handling device.
Figure 3:
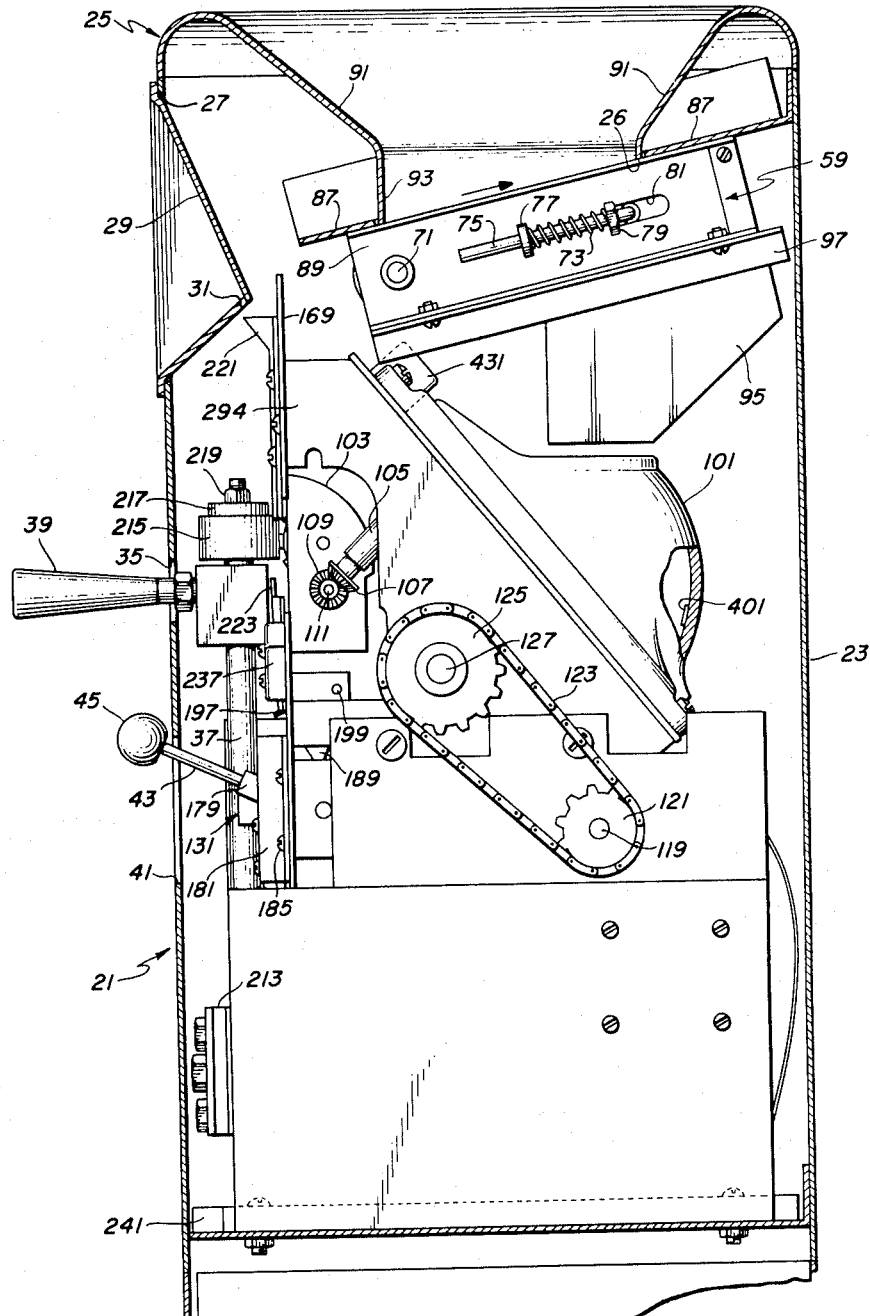
FIGURE 3 is a side elevational view with the cabinet cut away to illustrate parts of the coin handling device.

Referring to the drawings, and more particularly to FIGURES 1, 2 and 3, the reference numeral 21 designates the coin handling device which is adapted to be permanently mounted in a vendor's truck and will operate off the battery or its electrical system. The housing 23 is provided with a hopper 25, adapted to receive a batch of mixed coins of quarters, dimes and nickels. The housing 23 is provided with an opening 27, to receive a guide member 29 having a slot 31, to receive a ticket or revenue receipt 33. A slot 35 is formed in the front of the housing 23, to permit actuation of the print arm 37 by the handle 39. A U shaped slot 41 is formed in the front of the housing 23, to permit actuation of the opening and closing lever 43 by the handle 45. The bottom portion of the housing forms a compartment to receive the dime vault 47, nickel vault 49 and quarter vault 51. A support 53 is secured to the door 55 to prevent the vaults from moving in the compartment when the device is in route. The door 55 is provided with a conventional lock mechanism 57 to lock the door so that access to the vaults can be obtained only by authorized personnel.

Mounted on the front of the housing 23 is indicia 20 bearing the word "open" and indicia 30 bearing the word "closed" to designate the position of the opening and closing handle 45.

Figure 15:
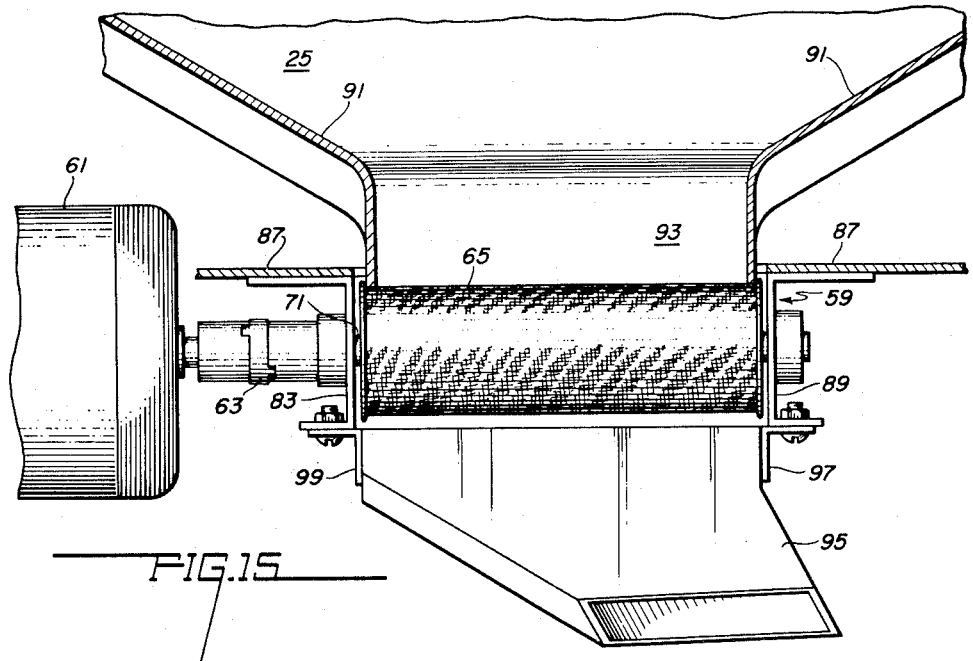
FIGURE 15 is a sectional view taken substantially along line 15—15 of FIGURE 16.
Figure 16:
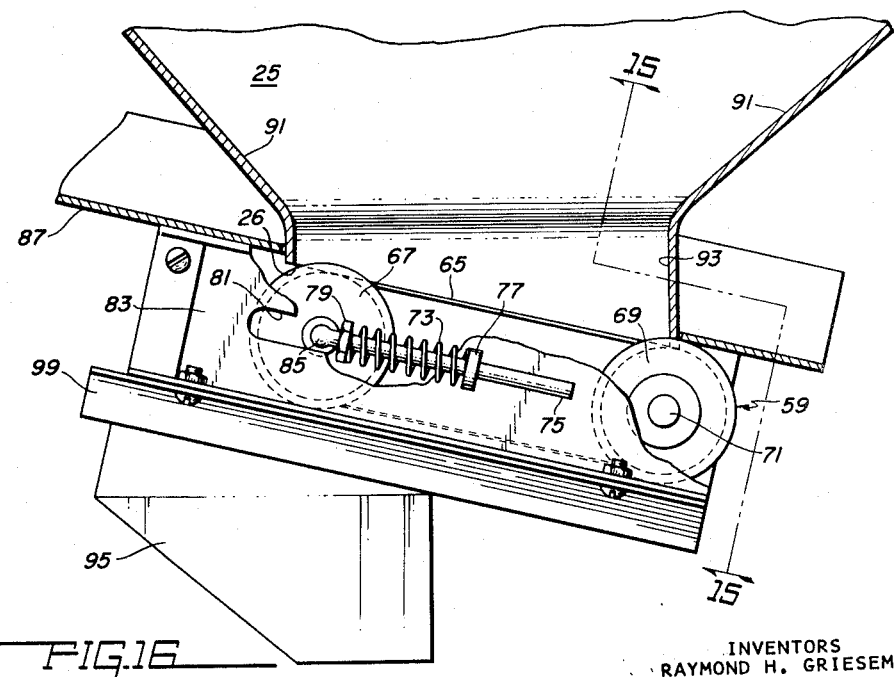
FIGURE 16 is a side elevational view of the conveyor assembly shown in FIGURE 15.

Referring to FIGURES 3, 15 and 16, the reference numeral 59 designates the conveyor which is driven by a motor 61, through a drive mechanism 63. The conveyor belt 65 is mounted on a pair of rollers 67 and 69. The roller 69 is driven by the shaft 71 connected to the coupling mechanism 63. Tension is maintained on the roller 67 by a spring 73 which is mounted on a rod 75, which is disposed between a collar 77 and nut 79. The tension on the spring 73 may be adjusted by tightening or loosening the nut 79. A slot 81 is provided in the support member 83 to slidably receive the shaft 85 which supports the roller 67. The conveyor assembly 59 is mounted to the frame 87 by L shaped supports 89 and 83. It should be noted that the hopper 25 is provided with side walls 91 that slope downwardly and terminate in a rectangular opening 93 which is slightly smaller than the width of the conveyor belt 65. This will prevent any coins from becoming lodged between the frame and the conveyor belt. The conveyor belt 65 transfers the coins from the hopper 25 to a conventional coin counter 101 through a coin chute 95 which is secured to the conveyor assembly 59 by means of L shaped supports 97 and 99.

The details of the coin counter are not shown and described in view of the fact that the mechanism is shown in Patent Number 1,295,900 issued to J. M. Johnson.

The coin counter is adapted to drive a printer 103 through shaft 105 having a gear 107 which will mesh with gear 109 mounted on the printer drive shaft 111. A number of printing wheels 113 having a number of spacers 115 are mounted on the shaft 111. The counter 101 is adapted to be driven by a motor 117, shaft 119, sprocket wheel 121, chain 123, sprocket wheel 125 and coin counter shaft 127. The interlock mechanism 129 is provided to prevent an overlapping of printing on the ticket or card receipt 33.

As illustrated in FIGURES 2 to 11, a lock mechanism 131 is operated by the opening and closing lever 43. A pair of locks 133 and 135 are mounted on a shaft 137. The lock member 133 is substantially similar to lock 135 therefore the details of lock 135 will only be described. Referring to FIGURE 11 the lock is provided with a U shaped body portion 139 adapted to straddle the shaft 137. Disposed on the outer ends of the U shaped body portions 139 are latch guides 141 and 143 which are in close proximity to the walls of the lock housing 145 and serve to guide the body portion 139 in the housing 145. Lock guide member 147 is provided with openings 149 and 151 to permit the latch portion 153 of the lock to protrude therethrough. A spring 155 is disposed between the U shaped body portion 139 and the shaft 137 to urge the latch outwardly through the opening 149 in the lock guide member 147. A pair of actuator projections 157 and 159 are mounted on the latch guide members 141 and 143 respectively. An actuating cam 161 is secured by a pin 163 on the shaft 137 and is adapted to contact the projections 157 or 159 to retract the latch 153 into the housing 145. Each latch is provided with a beveled surface 165 and 167. The lock mechanism is mounted on the frame member 169 by a pair of L shaped supports 171 and 173 which are provided with a pair of bearings 175 and 177 respectively. The operating lever 43 is connected to the shaft 137 by a flexible strap 179. A positioning member 181 having an E shaped cutout 183 is mounted on the frame 169 by a pair of screws 185.

Figure 6:
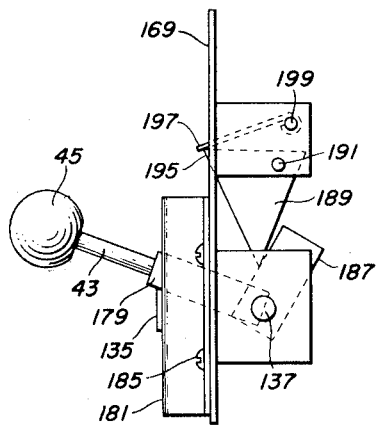
FIGURE 6 is a partial side sectional view of the opening and closing lever in the opening position.
Figure 7:
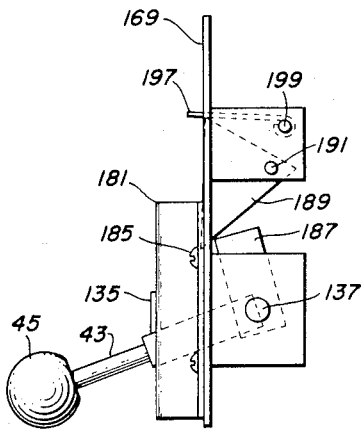
FIGURE 7 is a partial side sectional view of the opening and closing lever in the closing position.

Referring to FIGURES 6 and 7, the reference numeral 187 represents a rectangular lever mounted on the shaft 137 and is adapted to actuate a triangular member 189 mounted on a pivot shaft 191. The frame 169 is provided with an opening 193 to permit the end 195 to raise or lower the card stop member 197 which is mounted on a shaft 199. As will be seen in FIGURE 6 and FIGURE 8, when the lever 43 is in the open position 201 the card stop 197 will allow the ticket to be properly positioned for printing an opening reading. When the lever 43 is moved to the closed position 203 the lever 187 actuates the triangular member 189 to raise the card stop 197 so that the ticket is raised to permit a closing reading to be printed above the opening reading.

Figure 5:
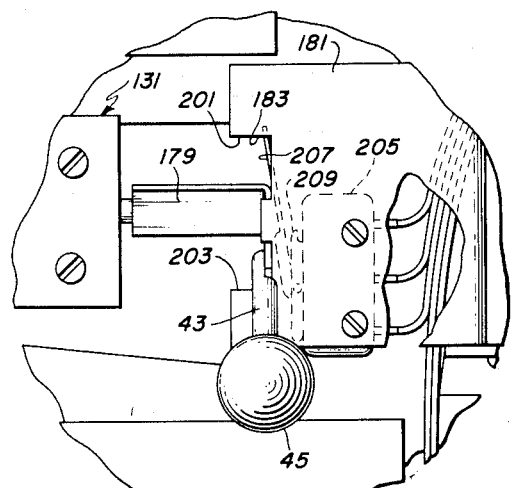
FIGURE 5 is a partial front sectional view showing the opening and closing lever in the closed position.

As illustrated in FIGURE 5, the opening and closing lever 43 is adapted to actuate the switch 205 through a lever 207 closing contacts 209.

Figure 4:
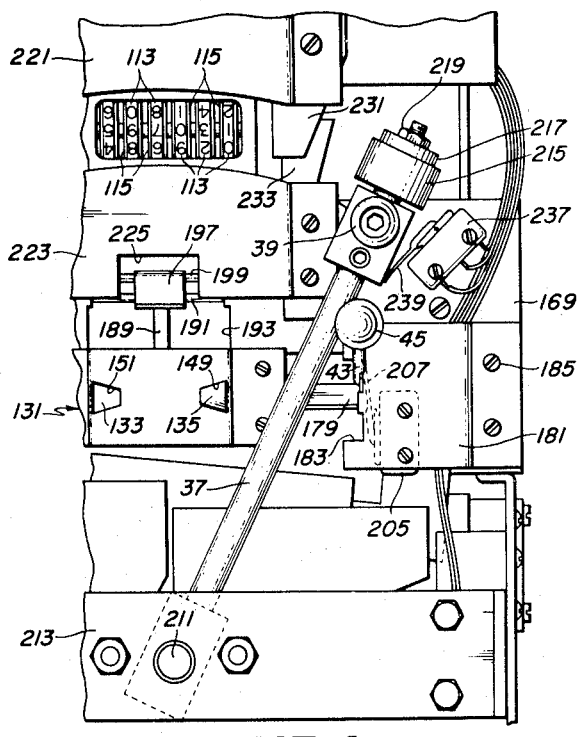
FIGURE 4 is a partial sectional view showing the print arm in the open position.

As illustrated in FIGURES 2, 3 and 4, the printing arm 37 is pivotally mounted on a shaft 211 which is supported by the frame member 213. The rubber roller 215 is secured on the upper end of the print arm shaft by a washer 217 and nut 219. The rubber roller is positioned so that it will be in slight contact with the printing wheels 113. A card receiver 221 is mounted on the frame 169 and is adapted to guide the card to the printing roll. A bottom card guide 223 is mounted on the bottom portion of the frame 169 and is provided with a slot 225 corresponding with the slot 193 to permit the card stop to extend therethrough. Flexible members 227, 229, 231 and 233 serve to guide the card to the card guide member 223 and will flex when the rubber roller passes thereover. When the print arm 37 is moved to the opening reading position 235 (FIGURE 1), the switch 237 will be actuated by the lever 239.

As illustrated in FIGURES 2 and 3, rails 241 and 243 are attached to the housing and serve to hold the coin handling mechanism, above described, in a solid position within the housing.

Referring to FIGURES 2, 12, 13 and 14 the reference numeral 245 designates a coin sorter. The coin sorter is rectangular in shape and is provided with a shaker plate 246 having a series of openings 247 which are larger than the diameter of a dime but smaller than the diameter of a nickel, and a series of openings 249 which are larger in diameter than a nickel and smaller in diameter than a quarter. The quarter will slide off the end 251 of the shaker plate 246 into the quarter chute 253 and then into the quarter vault 51. The dimes upon falling through the openings 247 fall into the dime chute 255 and then into the dime vault 47. The nickels upon falling through the openings 249 fall into the nickel chute 257 and then into the nickel vault 49.

The shaker plate 246 is provided with side walls 259 and 261, and an end wall 263. A plastic cover 265 having down-turned flanges 267 and 269 is mounted on the side walls 259, 261, and is disposed over the top of the shaker plate 246 to prevent the coins from bouncing out of the sorter. A coin chute 271 is disposed between the coin counter 101 and the forward portion of the shaker plate 246 between the end member 263 and cover plate 265 to convey the coins from the coin counter to the coin sorter. A support 273 having downturned flanges 275 and 277 for receiving a shaft 279 is mounted on the front end of the shaker plate 246. A mounting bracket 281 is mounted to the frame member 283 by screws 285.

The bell crank 287 is mounted on the shaft 289 and is connected to the shaft 279. It should be noted that the bell crank 287 supports the front end of the shaker plate 246 slightly higher than the end 251 so that when the shaker plate is operated the shaker plate will have a tendency to throw the coins on the plate forward. A mounting bracket 291 is mounted on the frame member 293 and supports a shaft 295. A crank or lever 297 is pivoted on the shaft 295 and connected to shaft 299, mounted between the side walls 259 and 261. An eccentric cam 301 is mounted on the shaft 303 of the counting motor 117 and is positioned to operate the cam follower 305 mounted on the end of the crank or lever 297. A spring 307 is connected to the end of the lever or crank 297 and to a support 309 mounted on the frame 296 of the counting mechanism 101 and functions to hold the cam follower 305 in contact with the cam 301.

Referring now to FIGURE 17 the terminal lines are designated by reference numerals 311 and 313. For the purpose of this illustration the terminal line 313 will be considered the positive, and the terminal line 311 will be considered negative. It has been found in actual practice that the batteries in trucks are not uniformly grounded and it is necessary to determine which post is grounded before the coin handling device is connected thereto. The black jumpers, on the drawing, 315, are used when the positive post of the battery is grounded. The white jumper 317 is used when the negative post of the battery is grounded.

If we assume that the opening and closing lever 43 is moved from the closed position to the open position, the switch 205 is closed and a timer initiating circuit is energized from terminal 311, switch 205, line 319, switch 237, line 321, line 323, line 325, capacitor 327, resistor 329, line 331, line 333 and line 313. The capacitor now becomes charged to full supply voltage.

The print arm 37 is moved from left to right to position 235, thus moving the switch arm 237 from contact 335 to contact 337. A timing circuit is initiated through terminal line 311, switch 205, line 319, switch 237, line 339, line 341, relay coil 343, transistor 345, line 347, line 333 and line 313. When the relay 343 is energized switch 344 is closed.

A base control circuit is established from the capacitor 327, line 325, line 323, line 349, resistor 351, and transistor 345, line 347, line 333, line 331 and resistor 329. The base control circuit serves to bias the transistor allowing it to conduct current to establish a timing circuit for approximately four (4) minutes. The counting mechanism motor 117 is energized through line 311, switch 205, line 319, switch 344, line 353, counting motor 117, and line 355 to terminal line 313.

The conveyor motor 61 is energized through lines 311, switch 205, line 319, switch 344, line 357, switch 359, line 361, switch 363, line 365, coil 367, line 369, switch 371 and line 373 to terminal line 313.

The counting motor is provided with a reversing cam 375 which will permit switch 363 and switch 371 to be positioned on contacts 377 and 379 respectively for a rotation period of 240° of the motor. The cam 375 will move the switches 363 and 371 to contacts 381 and 383 respectively for a period of 120° to reverse the polarity of the field of the motor 61 thereby reversing the conveyor which will move the coins backwardly away from the slot opening thus preventing a jamming condition. When the switches 363 and 371 are on contacts 381 and 383 respectively, a circuit is energized through line 311, switch 205, line 319, switch 344, line 357, switch 359, line 361, contact 385, line 387, contact 383, switch 371, line 369, field 367, line 365, switch 363, contact 381 and line 389 to the terminal line 313.

The armature 391 is in parallel with the field through line 311, switch 205, line 319, switch 344, line 357, switch 359, line 361, contact 385, line 393, armature 391 and line 395 to the terminal line 313.

When coins are placed in the hopper 25, and progress into the counter hopper, a hopper leveling circuit is energized through terminal line 313, line 397, coin 399, hopper switch 401, line 403, line 405, line 407, relay coil 409, line 411, line 413, line 339 contact 337, switch 237, line 319, switch 205 to terminal line 311. When relay coil 409 is energized, switch 359 will be opened and the single-pole double throw switch 415 will be moved from contact 417 to contact 419. The capacitor 421 will be charged through line 313, line 397, coin 399, hopper switch 401, line 403, line 405, line 423, capacitor 421, resistor 425, line 427, line 413, line 339, switch 237, and line 319 to terminal line 311. It should be noted that the hopper switch 401 is positioned on the side wall of the hopper (FIGURE 3) so that it will serve as a leveling switch. When the coins reach this predetermined level to energize the hopper leveling circuit, the release operating switch 359 is opened thus de-energizing the circuit to the conveyor motor 61 whereby no more coins are fed to the hopper.

As pointed out above, when the hopper leveling circuit is energized the single-pole double throw switch 415 moves to contact 419 thereby recharging capacitor 327 through line 311, switch 205, line 319, switch 237, line 339, switch 415, line 429, line 325, capacitor 327, resistor 329, line 331 and line 333 to the terminal line 313. The capacitor is now charged and will operate for approximately another four minutes to charge the transistor 345. The capacitor 421 serves as a time delay dropout for the relay coil 409 and will keep it energized for approximately two to four seconds, thus avoiding the relay's response to each coin as it bounces past the hopper switch, and establishing an "average" level signal.

A pall switch 431 (FIGURES 3 and 17) is disposed in position to be actuated by the coins on the pickup plate of the counter 101. As the coins pass the pall switch they will move the switch from contact 433 to contact 435 and charge the capacitor 327 through line 311, switch 205, line 319, switch 237, line 339, switch 415, line 437, switch 431 (contact 435), line 439, line 325, capacitor 327, resistor 329, line 331 and line 333 to terminal line 313.

When all the coins have been counted the light 441 will be energized through terminal line 311, switch 205, line 319, switch 237, line 339, switch 415, line 437, switch 431, contact 433, light 441, line 443 and line 333 to terminal line 313. When the light 441 is continually energized it will indicate that a complete counting cycle has been accomplished and the hopper is empty.

*Operation*

The route man, before starting on his route, will move the opening and closing lever 43 to the open position and insert a route revenue receipt 33, upside down with respect to the print thereon, into the slot 31 until the revenue receipt rests on top of the card stop 197, when the printing arm handle 39 is moved to the right (FIGURE 1) thus printing of the opening register reading is obtained. The card is then removed and the opening and closing lever handle 45 is then moved to the closed position 203 and the printing arm handle 39 is then moved to the left (FIGURE 1). The route man, upon completing his day's work and returning to the office, will again place the opening lever handle 45 to the opening position 201 and move the print arm 37 to the right to position 235. He will then insert the route revenue receipt 33 moving the opening and closing lever 43 to the closed position 203, and move the print arm handle 39 to the left operating a closing reading on the route revenue receipt. A subtraction of the opening reading from the closing reading will indicate in dollars and cents the total amount of money collected on the route that day.

When the route man reaches the first location he will service the coin machines and note on the route revenue receipt the inventory used to replenish the machines on location. Upon returning to the truck the route man will place the route revenue receipt 33 in the card slot 31 and dump the coins in the hopper 25. The opening and closing lever handle 45 is moved to the open position 201 which closes switch 205 to energize the timer circuit. The print arm handle 39 is then moved to the right which prints the opening reading on the route revenue receipt 33, and moves the switch 237 from contact 335 to contact 337 thereby starting the coin handling device into counting operation. If the route man desires he can now drive to the next location while the coin handling device is counting and sorting the coins dumped into the hopper. It should be noted that when the opening and closing lever 43 is moved to the open position 201, the lock 165 is withdrawn which permits the print arm to move to the right. When the print arm comes into contact with the beveled surface 167 the latch 135 will be depressed against a spring 155 permitting the arm to move to the position 235. The spring 155 will then actuate the latch 135 outwardly to prevent the print arm from being moved to the left.

The hopper 25 is of substantial size and may hold as much as one hundred dollars in mixed coins. When the print arm is moved to the right, switch 237 will move to contact 337 thus energizing relay 343, closing switch 344 whereby the conveyor motor 61 and counting motor 117 are energized. The conveyor motor 61 will rotate the conveyor belt 65 approximately 240° forward moving the coins in the direction of the arrow in FIGURE 3, thereby transferring a portion of the coins through slot 26 to a chute 95 which directs the coins to the counter hopper 101. The cam 375 mounted on the counting motor 117 will operate switches 363 and 371 to reverse the field of the conveyor motor 61 so that the conveyor will rotate approximately 120° counterclockwise thus moving the coins away from the slot 26 which prevents a jamming condition of the coins at the slot. The counter operates substantially the same as that illustrated in the Patent No. 1,295,900 issued to J. M. Johnson. A hopper switch 401 is mounted in the coin hopper and functions to deenergize the conveyor motor 61 when a predetermined level of coins is received in the counter hopper by energizing relay 409 which opens switch 359, thus breaking the circuit to the conveyor motor 61. When the coins drop below the predetermined level, relay 409 will be de-energized and the switch 359 will again close to energize the conveyor motor 61. The pall switch 431 is mounted in close proximity to the coin pickup wheel (not shown) and is adapted to be actuated by each coin as it passes through the counter. The pall switch functions to keep the counter operating until the last coin has passed therethrough. To insure that the coin handling device will continue to operate while a coin is either in the hopper, the sorter, or the counting mechanism hopper, the four minute time cycle established by the transistor 345 and capacitor 327 is utilized.

The counter actuates a shaft 105 having a gear 107 in mesh with gear 109 which drives gear 111 of the printing wheels 113. As the coins are passed through the counter they are conveyed to a sorter by a chute 271. The sorter is driven by the counting motor 117 which has a cam 301 mounted on the drive shaft 303. The cam follower 305 actuates the lever 297 which is connected to the sorter at 299 to operate sorter plate 246. The crank 287, mounted on the other end of the sorter, tends to move the sorter up and down and to pitch the coins a slight distance forward. As the coins move forward on the sorter plate 246, the dimes will fall through the openings 247, and the nickels will fall through the openings 249, and the quarters will be transferred over the end of the plate at 251. A dime chute 213 is disposed under the openings 247 to transfer the coins to the dime vault 47. A similar chute 257 is disposed under the nickel openings 249 to transfer the nickels to the nickel vault 49. Another chute 253 is disposed at the end of the sorter plate 246 to transfer the quarters to the quarter vault 51. When the last coin has passed the pall switch 431, the light 441 will be illuminated continually to indicate that the counting cycle is completed.

When all the deposited coins have been processed, counted and sorted, and after either the indicator light 441 illuminates continually, or, the four minute time cycle ends, the route operator may take a closing reading. The opening and closing handle 45 is moved to the closed position 203. When the opening and closing lever 43 is moved to the closed position the ticket stop 197 raises the route revenue receipt upwardly in the card guide 221 so that a closing reading may be obtained above the opening reading. The card stop 197 is actuated (FIGURES 6 and 7) by means of a card stop actuator 195 and lever 187, mounted on the shaft 137. When the lever 43 is moved to the closed position 203, the latch 135 is retracted by means of the shaft 137 and cam 161 (FIGURES 9 and 11), to permit the printing arm to move from right to left. The rubber impression roller 215 presses the carbon and record paper against the counter wheels 113 to print the total number of coins counted, upon the route revenue receipt 33. It should be noted that the latch 133 has a beveled surface 165 which will permit the print arm 37 to depress the latch 133 and the spring will return the latch 133 to the locked position as soon as the print arm passes thereover, thus locking the print arm in the left hand position. The route revenue receipt now being printed with an opening and closing reading is withdrawn and the route man can make a subtraction and determine whether the cash receipts check with the inventory sold.

In order to prevent damage to the counting mechanism if an operator attempts to make a closing print reading while the coins are still being counted, and to properly position the route revenue receipt relative to the print arm, electrical interlocks have been provided. For example, if the operating lever 43 is actuated, switch 205 is opened and all circuits are broken and the counting motor 117, and conveyor motor 61 are de-energized. It the print arm 37 and locking lever 43 are not in the proper relative position to insure that the mechanical locks 133 and 135 are in proper position either switch 237 or 205 breaks the counting motor 117 or conveyor motor 61 circuits.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:

1. A portable coin handling device which is designed to receive a batch of mixed coins from a suitable source of supply and adapted to count the monetary value of the mixed coins, sort the coins into their proper denominations and transfer the sorted coins into individual vaults, said device comprising:
    (a) a coin hopper adapter to receive a batch of mixed coins,
    (b) conveyor means located adjacent the bottom of the coin hopper,
    (c) a coin counter mounted to receive the coins from the conveyor means,
    (d) said coin counter provided with means to actuate a register means which will totalize the monetary value of the coins passing through the coin counter,
    (e) said register means including an arm having a roller adapted to print a reading on a ticket of the totalized monetary value of coins which have passed through said coin counter,
    (f) sorter means adapted to receive the coins from the counter means, whereby coins of different denominations will be separated according to their respective denominations, and
    (g) vault means disposed below the sorter means to receive the sorted coins from the sorter means.

2. A portable coin handling device which is designed to receive a batch of mixed coins from a suitable source of supply and adapted to count the monetary value of the mixed coins, sort the coins into their proper denominations and transfer the sorted coins into individual vaults, said device comprising:
    (a) a coin hopper adapted to receive a batch of mixed coins.
    (b) conveyor means located adjacent the bottom portion of the coin hopper and in communication therewith,
    (c) said conveyor means including a belt adapted to travel forward a predetermined distance and then rearwardly a distance which is less than the forward travel,
    (d) a coin counter mounted to receive the coins from the conveyor belt,
    (e) said coin counter provided with means to actuate a register means which will totalize the monetary value of the coins passing through the coin counter,
    (f) said register means including a printing means for printing on a ticket the totalized monetary value of coins which have passed through said coin counter,
    (g) sorter means disposed to receive the coins from the counter means, whereby coins of different denominations will be separated according to their respective denominations, and
    (h) a number of vaults positioned with respect to the sorter means to receive the separated coins in accordance with their respective monetary value.

3. A portable coin handling device which is designed to receive a batch of mixed coins from a suitable source of supply and adapted to count the monetary value of the mixed coins, sort the coins into their proper denominations and transfer the sorted coins into individual vaults, said device comprising:
- (a) a coin hopper adapted to receive a batch of mixed coins,
- (b) conveyor means located adjacent the bottom portion of the coin hopper and in communication therewith,
- (c) said conveyor means including a belt adapted to travel forward a predetermined distance and then rearwardly a distance which is less than the forward travel to prevent the coins from jamming between the hopper and conveyor belt,
- (d) a coin counter mounted to receive the coins from the conveyor belt,
- (e) said coin counter provided with means to actuate a register means which will totalize the monetary value of the coins passing through the said counter,
- (f) said register means including a printing means for printing on a ticket the totalized monetary value of coins which have passed through said coin counter,
- (g) control means for energizing the conveyor means and coin counter,
- (h) interlock means associated with the control means so that the printing means can only be actuated when the control means is in a predetermined position,
- (i) sorter means disposed to receive the coins from the counter means, whereby coins of different denominations will be separated according to their respective denominations, and
- (j) a number of vaults positioned with respect to the sorter means to receive the separated coins in accordance with their respective monetary value.

No references cited.

LOUIS J. CAPOZI, *Primary Examiner.*